INVENTOR
KASMIR E. ULAKY

May 21, 1968  K. E. ULAKY  3,384,256
HYDRAULICALLY OPERATED SCOOP
Filed Feb. 6, 1967  2 Sheets-Sheet 2

INVENTOR
KASMIR E. ULAKY
BY
Morse, Altman & Oates
ATTORNEYS

United States Patent Office 3,384,256
Patented May 21, 1968

3,384,256
HYDRAULICALLY OPERATED SCOOP
Kasmir E. Ulaky, Range Road, Windham, N.H. 03087
Filed Feb. 6, 1967, Ser. No. 614,085
5 Claims. (Cl. 214—778)

ABSTRACT OF THE DISCLOSURE

The purpose of the invention is to provide a power scoop which is quickly and easily attachable to and detachable from an automotive vehicle which is equipped to supply fluid under pressure for hydraulic operation of the scoop. The apparatus comprises a simple frame to be pinned to a pair of brackets projecting out from the front of the vehicle, a linkage connecting the scoop to the frame, cylinders and pistons for elevating and tilting the scoop, and flexible tubes communicating with the cylinders.

---

A power scoop constructed as an accessory to an automotive vehicle is hereinafter described in detail and is illustrated on the drawings, of which:

Figure 2:
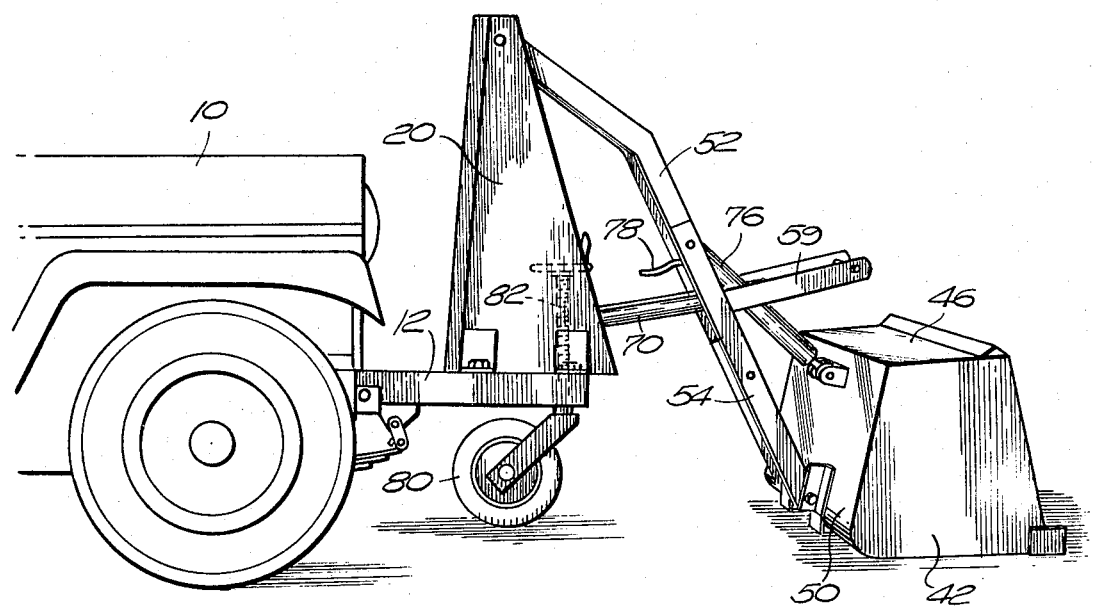
FIGURE 2 is a side elevation of the same, on a smaller scale, attached to an automotive vehicle.
Figure 3:
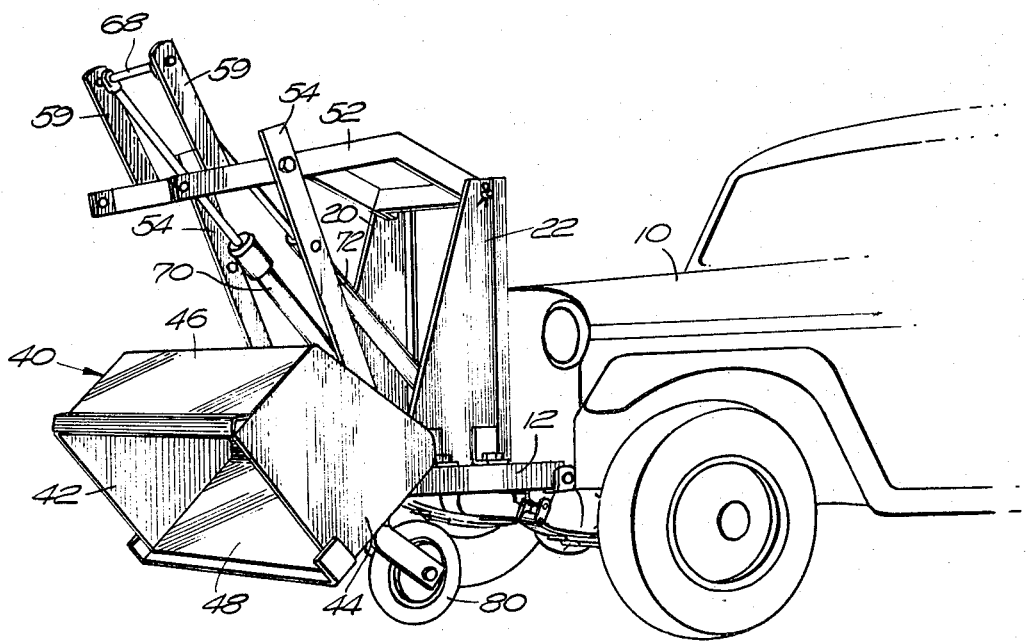
FIGURE 3 is a perspective view of the same attached to a vehicle, in a jackknifed condition for road travel.

The forward portion of an automobile vehicle 10 is shown in FIGURES 2 and 3. Horizontal brackets 12 are permanently secured to the side members of the main frame of the chassis and project forward from the front of the vehicle. Each of these brackets may consist of a steel channel member on its side with an inner web 14 spaced from the upper side wall 16 of the channel to admit ears 18 between them.

The detachable scoop assembly comprises a pair of parallel uprights 20, 22, each having at its lower end a pair of ears 18 projecting horizontally outward and adapted to enter and fit between two horizontal elements, namely, the web 14 and side wall 16 of the adjacent bracket 12. The web 14 and side walls of each bracket are provided with sets of vertically aligned holes 24 spaced to register with holes 26 in the ears 18 so that pins 28 can be dropped through aligned holes 24, 26 to secure the scoop assembly quickly and easily to the brackets 12. Suitable cross members 30, 32, 34 are secured to the uprights 20, 22 to brace and reinforce them.

An elongated scoop 40 having end walls 42, 44, side walls 46, 48 and a bottom 50 is connected to the uprights by a pair of elongated links rockably attached at their upper end to the upper end of respective uprights and rockably attached at their lower end to the bottom 50 of the scoop 40 at spaced points. Each link consists of two overlapping parts 52, 54 secured together by spaced bolts 56, 58. If the lower bolts 58 are removed and the link parts 52 are raised, the scoop and link parts 54 will hang down as shown in FIGURE 3 which is desirable when a considerable distance is to be traveled along a road. Each link member 52 has an arm 59 projecting forward therefrom. The links are braced and reinforced by suitable cross members 60, 62, 64, 66, 68, each of these members extending from one link member 52 to the other.

To operate the scoop hydraulic power means are provided most of which, including a pressure pump and control valves are standard apparatus installed in the vehicle and not shown on the drawings. The power means include two hydraulic cylinder and piston units 70, 72 rockably secured at one end to the cross member 68 which extends between the forward ends of the arms 59 and at the other end to a transverse bar 73 between the lower ends of the uprights. Flexible tubes 74 communicate with the cylinders and are connectible to tubes carried by the vehicle and not shown on the drawings.

Figure 1:
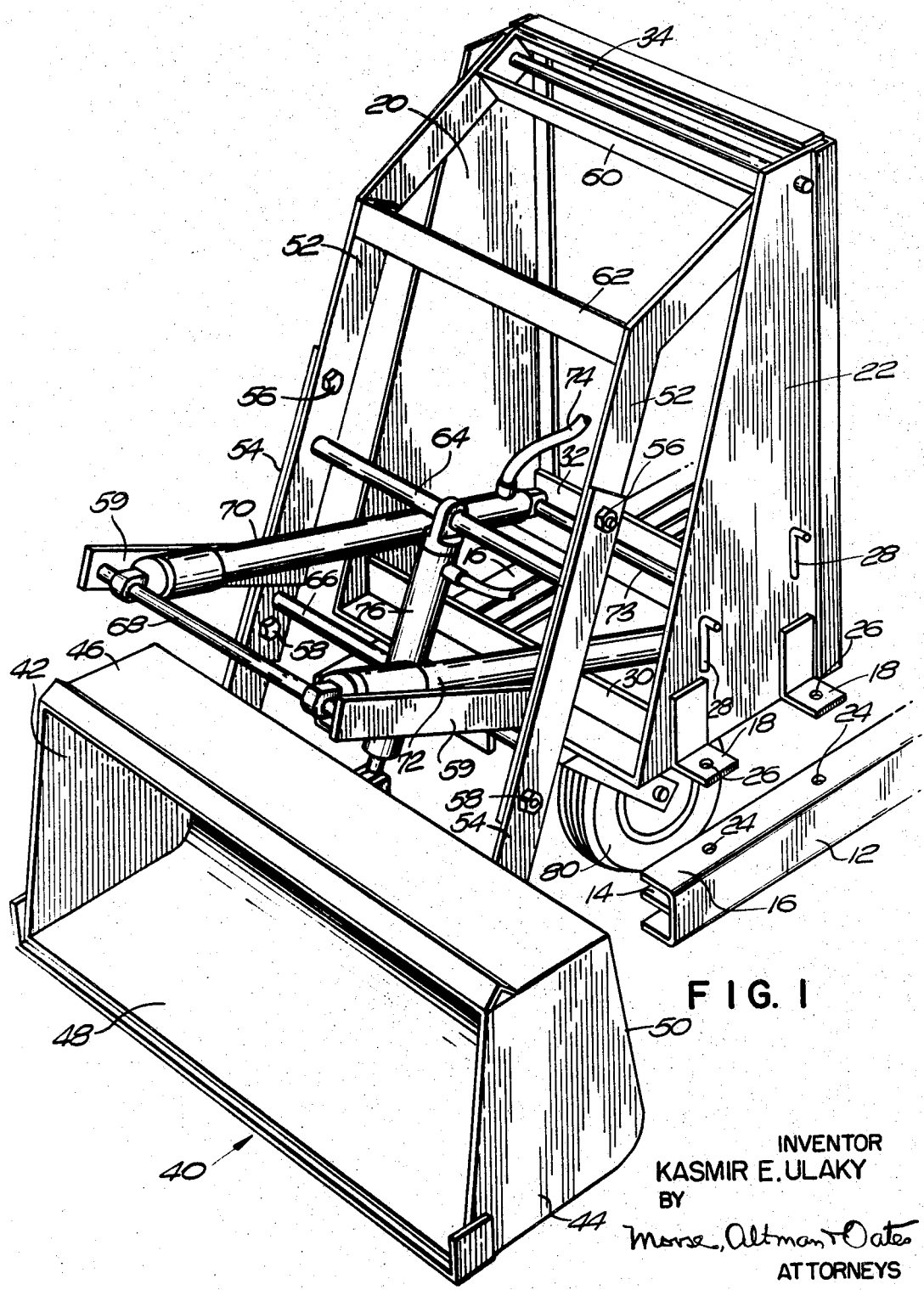
FIGURE 1 is a perspective view of a power scoop embodying the invention.

The scooping position of the scoop 40 is illustrated in FIGURES 1 and 2. The vehicle is advanced when the scoop is in that position to gather into the scoop snow or equivalent material which may be in front of it. When the scoop is sufficiently filled, it is swung upward to an elevated position in which it is upright. When the vehicle has been maneuvered to suspend the scoop over the place where the contents are to be deposited, the scoop is rocked forward to dump the contents. For this purpose a hydraulic cylinder and piston unit 76 is pivotally connected at one end to the cross bar 64 and at the other end to the bottom 50 of the scoop. A flexible tube 78 communicating with the cylinder 76 is attachable to a tube (not shown) in the vehicle.

To facilitate attaching the structure to the vehicle, a support wheel 80 is provided between and below the uprights 20, 22. When the apparatus is detached from the vehicle, the scoop 40 rests on the ground and the rest of the apparatus is supported by the wheel 80. When the apparatus is to be attached to the vehicle, it is raised by manual rotation of a threaded shaft 82 until the ears 18 are on a level with the spaces between the top wall 16 of the brackets 12 and the webs 14. The vehicle is then advanced until the holes 24 register with the holes 26, whereupon the pins 28 are dropped into the holes, securing the apparatus to the vehicle, the hydraulic hoses are quickly connected, the support wheel 80 is raised to clear the ground, and the apparatus is then ready for operation. When a load of material is picked up by the scoop, the forward springs of the vehicle allow the apparatus to lower until the wheel 80 touches the ground. The wheel then takes much of the load, relieving further stress on the vehicle.

I claim:

1. In combination with an automotive vehicle having a pair of brackets projecting out in front thereof, apparatus comprising parallel uprights detachably secured to said brackets and rising upward therefrom, an elongated scoop having end walls, side walls and a bottom, a pair of rigid links rockably secured at one end to said bottom at spaced points thereof and at the other end to respective uprights near the upper end thereof, each link having rigidly secured thereto at an intermediate point thereof a forwardly projecting arm, and power means for swinging said scoop upward, said means including a pair of hydraulic cylinder and piston units pivotally connected at one end to said uprights near the lower end thereof and at the other end to the forward end of said arms, and flexible tubes communicating with said cylinders respectively.

2. The combination described in claim 1, said apparatus having cross members reinforcing said uprights, other cross members reinforcing said links, and power means for rocking said scoop relatively to said links, said rocking means including a hydraulic cylinder and piston unit pivotally secured at one end to the bottom of the scoop and at the other end to one of said cross members between the links, and a flexible tube communicating with the last mentioned cylinder.

3. The combination described in claim 1, said brackets including two horizontal elements spaced one above the other with vertically aligned holes therethrough, a pair of ears projecting horizontally from the lower end of each said upright and adapted to fit between said horizontal elements, each said ear having a hole therethrough adapted to register with aligned holes in said brackets, and pins adapted to fit in aligned holes to secure said uprights and the structure associated therewith to said vehicle.

4. Apparatus as described in claim 1, each said link consisting of two overlapping parts, the upper part being rockably secured to one of said uprights and having one of said arms projecting therefrom, the lower part of each link being rockably secured to said scoop, and a pair of bolts fastening the overlapping parts of each said link together, whereby the removal of one bolt from each link permits the parts of the links to jackknife about the remaining bolts.

5. Apparatus as described in claim 1, including a supporting wheel arranged between and below said uprights, and means operable to raise and lower the wheel when the apparatus is detached from the vehicle, whereby to adjust the level of the ears to the level of the brackets.

No references cited.

HUGO O. SCHULZ, *Primary Examiner.*